No. 895,336. PATENTED AUG. 4, 1908.
A. V. BRYCE.
LOCKING NUT.
APPLICATION FILED SEPT. 16, 1907.

Witnesses:
S. R. Rodd.
Chas. S. Sepley.

Inventor:
Arthur V. Bryce
by O. M. Clarke
his Attorney

UNITED STATES PATENT OFFICE.

ANDREW V. BRYCE, OF PITTSBURG, PENNSYLVANIA, ASSIGNOR TO INTER-STATE MANUFACTURING COMPANY, OF PITTSBURG, PENNSYLVANIA, A CORPORATION OF ARIZONA TERRITORY.

LOCKING-NUT.

No. 895,336.     Specification of Letters Patent.     Patented Aug. 4, 1908.

Application filed September 16, 1907. Serial No. 393,069.

*To all whom it may concern:*

Be it known that I, ANDREW V. BRYCE, a citizen of the United States, residing at Pittsburg, in the county of Allegheny and State of Pennsylvania, have invented certain new and useful Improvements in Locking-Nuts, of which the following is a specification, reference being had therein to the accompanying drawing.

My invention consists of an improvement in locking nuts for bolts, etc. of that class wherein a turning nut is provided with an internal threaded bushing adapted to engage the bolt under turning action of the nut and to gradually tighten upon it so as to prevent its loosening.

The invention has for its object to provide a device of this character which shall be simple and efficient in construction, cheap to manufacture, so constructed that the nut and contained bushing may be assembled and maintained in operative relation to each other without separation during shipment or handling, and generally adapted to tightly hold a bolt without danger of loosening as shall be more fully hereinafter described.

Figure 1:
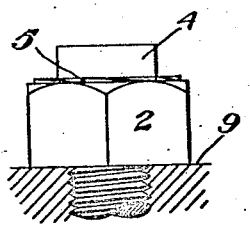
Figure 2:
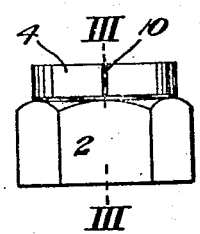
Figure 3:
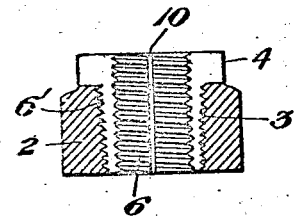
Figure 4:
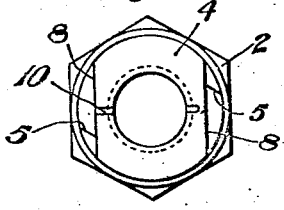
Figure 5:
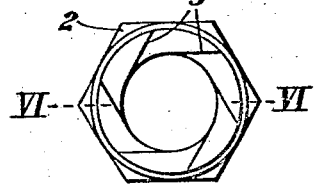
Figure 6:
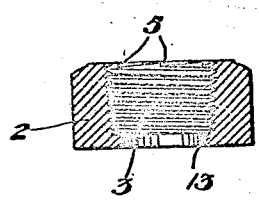
Figure 7:
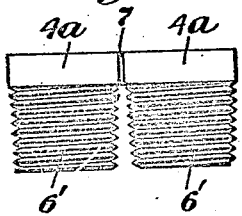
Figure 8:
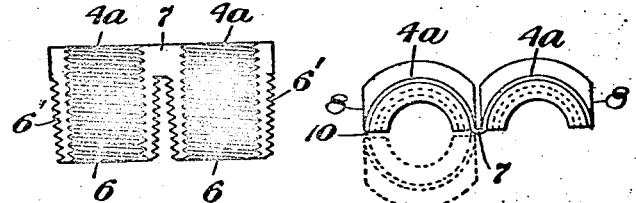
Figure 9:
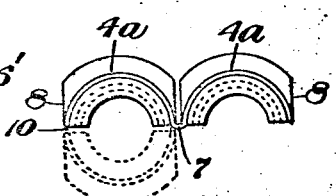
Figures 10, 11, 12:
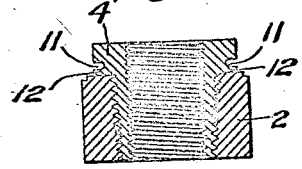
Figure 13:
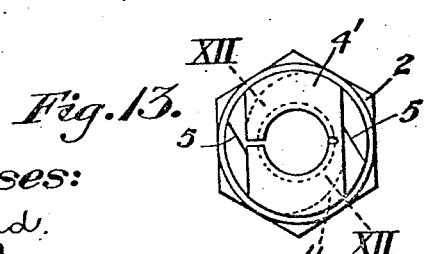

Referring to the drawings: Figures 1 and 2 are views in side elevation of the device employing a hexagon nut. Fig. 3. is a vertical sectional view on the line III. III. of Fig. 2. Fig. 4. is a plan view of Fig. 1. Fig. 5. is a plan view of the outer nut, the interior bushing having been removed. Fig. 6. is a vertical section on the line VI. VI. of Fig. 5. Fig. 7. is a plan view of the bushing blank. Fig. 8. is an inverted plan view of Fig. 7. Fig. 9. is an end view of the bushing blank, its assembled form being indicated in dotted lines. Figs. 10 and 11 are views in elevation showing a modified construction. Fig. 12. is a vertical sectional view on the line XII. XII. of Fig. 11. Fig. 13 is a plan view of the construction shown in Fig. 10.

Referring to the drawings, 2 is a turning nut of any suitable outside form, either square or hexagon, the interior of which is provided with downwardly narrowing tapered threads 3 as shown in Fig. 6 adapted to receive the interior bushing 4 as shown in Fig. 3. The upper face of nut 2 is provided with a series of serrations or shoulders 5 adapted to engage the edges of bushing as it is screwed home and to positively prevent disengagement ... 2 whereby the bushing and nut will constantly maintain their relative position.

In Figs. 7, 8 and 9 I illustrate my preferred form of bushing, for facility in casting, whereby the interior and exterior threads 6 and 6' may be cast, thus greatly cheapening the operation. The bushing as shown is cast in two halves 4ᵃ, 4ᵃ, approximately semi-cylindrical as to their body portion and joined by a thin web of metal 7, the enlarged head of the bushing having flat parallel sides 8 so that when in position it may be readily turned by a wrench. Between the sides 8 at each end are the projecting longer head portions adapted to bear on the upper face of nut 2. The bushing blank shown in said figures is bent around upon itself, the connecting bridge 7 maintaining its integral connection or being fractured in the operation without affecting its assemblage with the nut, whereupon the bushing is inserted downwardly into the nut cavity as clearly shown in the drawings, particularly Fig. 3, by merely screwing it thereinto.

In applying the device, the bushing and its surrounding nut are screwed downwardly upon a bolt as shown in Fig. 1 until the nut 2 binds against any meeting surface 9, as for instance the face of a fish bar in making a rail joint, whereupon the bushing 4 is then screwed in until it has made a tight binding hold. The operation of thus screwing in the bushing will, by reason of the tapered threads 3 making a correspondingly exteriorly tapered thread 6', cause the bushing to bind inwardly upon the bolt, clearance being provided for such purpose by means of the slot 10. The parts are so arranged and designed that the under side of the head of the bushing will seat upon the outer face of nut 2, and the lower edges of faces 8 will engage the shoulders 5. As thus assembled the complete device will act as a nut, securely holding the parts together by means of the bolt, and disengagement or looseness will be absolutely prevented. Should for any reason the parts become loose they may be readily adjusted by merely turning either the nut or the bushing, to take up wear.

In Figs. 10, 11 and 12 I have shown the bushing 4' as provided along one or both sides with an undercut groove 11, providing a lower thin flange 12, which may be readily driven downwardly by any suitable means as a cold chisel so as to positively and more securely engage the locking shoulders 5.

For the purpose of limiting excessive inward pressure of the bushing under turning operation, and feed of the threads, the nut 2 may be provided with an annular limiting shoulder 13 (Fig. 6) against which the lower edge of the bushing will abut when or before it has been drawn down flush with the top of the nut.

By reason of the construction of the device in either form, it will be noted that the nut may be screwed against a permanent bearing, or against a temporary abutment for the purpose of causing the binding action of the bushing upon the bolt, thus positively holding the nut in any desired position.

As thus constructed this device in its complete form constitutes a strong, efficient and durable locking nut having great strength and continuous holding power.

It may be used in various adaptations, and may be changed or varied in different details of construction or design or in other features by the skilled mechanic, but all such changes are to be considered as within the scope of the following claims.

What I claim is:—

1. A locking nut consisting of an outer nut having a bearing base and interior threads and an outer serrated face, and a divided bushing having exterior and interior threads and a terminal head adapted to bear by its under face upon said serrated face to prevent reverse motion of the bushing, substantially as set forth.

2. A locking nut consisting of an outer nut having an interior tapered thread, and a divided bushing provided with exterior and interior threads and having a depressible portion adapted to be bent down against the adjacent face of the outer nut, substantially as set forth.

3. A locking nut consisting of an outer nut having an interior tapered thread, and a divided bushing provided with exterior and interior threads and having an undercut head providing a depressible lip adapted to be bent down against the adjacent face of the outer nut, substantially as set forth.

4. In a locking nut, the combination of an outer threaded nut having a serrated outer face, and a divided bushing having exterior and interior threads and a turning head adapted to contact by its under face with said serrated outer face to prevent reverse rotation, substantially as set forth.

5. In a locking nut, the combination of an outer nut having interior tapered threads and a serrated bearing face, and a bushing assembled therewith consisting of divided halves having exterior tapered and interior straight threads, and a correspondingly divided turning and bearing head adapted to make contact by its under side with said serrated face, substantially as set forth.

In testimony whereof I affix my signature in presence of two witnesses.

ANDREW V. BRYCE.

Witnesses:
GEO. B. BLEMING,
C. M. CLARKE.